May 28, 1940.  J. G. MORGAN  2,202,353
PHOTOGRAPHIC APPARATUS
Filed May 18, 1939
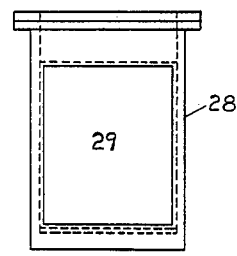
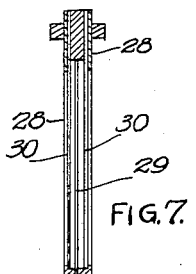
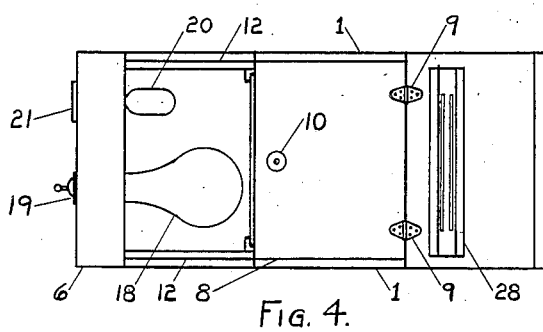
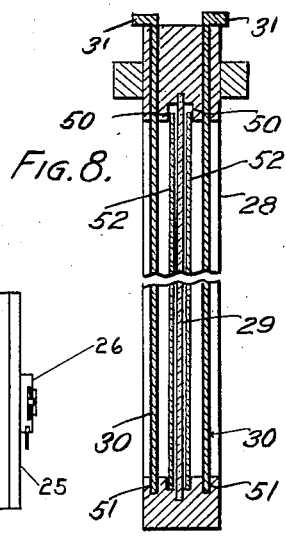
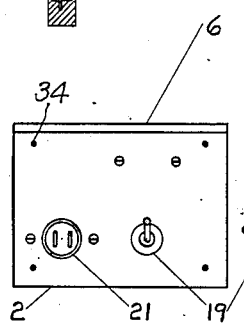
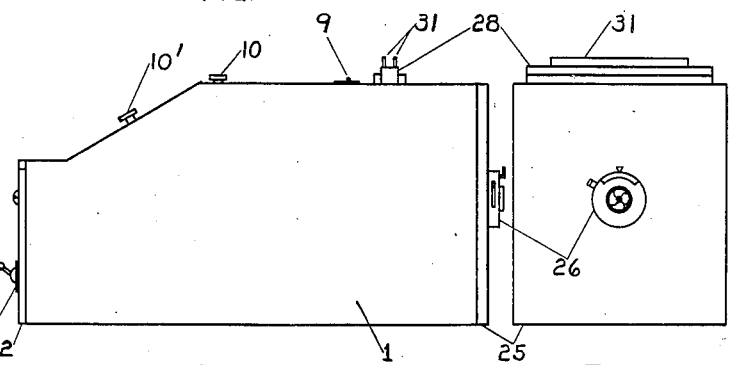
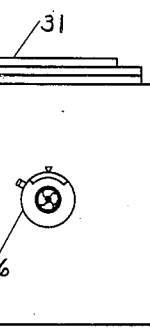
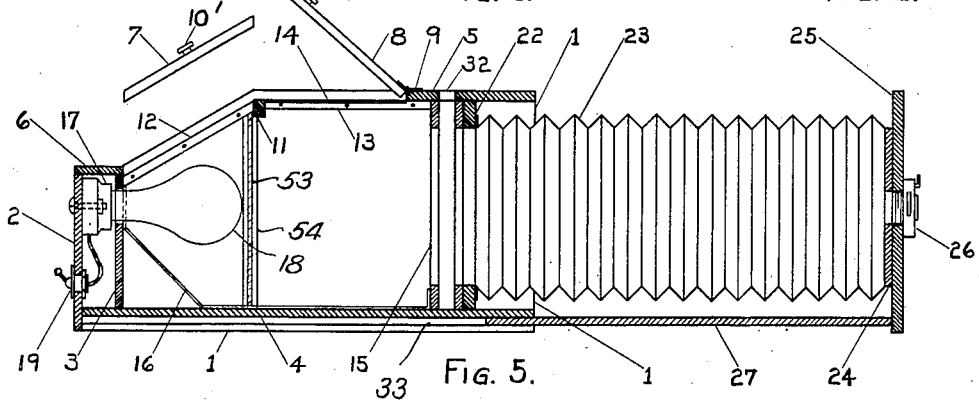
INVENTOR
Joseph G. Morgan
PER Victor J. Evans & Co.
ATTORNEYS Patented May 28, 1940

2,202,353

UNITED STATES PATENT OFFICE 2,202,353

PHOTOGRAPHIC APPARATUS

Joseph G. Morgan, Phoenixville, Pa.

Application May 18, 1939, Serial No. 274,461

1 Claim. (Cl. 88—24)

This invention relates to photographic apparatus and has for an object to provide a single apparatus which may be used for four different operations, namely, as a camera, as an enlarger, as a printer, and as a copying machine.

A further object is to provide apparatus of this character which will be formed of a few strong, simple and durable parts which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a side elevation of photographic apparatus constructed in accordance with the invention.

Figure 2 is a front elevation of the apparatus showing the shutter, and film holder in the camera slide.

Figure 3 is a rear elevation of the apparatus showing the plug connection for the ruby bulb and the switch for the white bulb.

Figure 4 is a top plan view of the apparatus showing the two bulbs, the hinged door, and the opening to receive the film holder.

Figure 5 is a longitudinal sectional view of the apparatus with the bellows extended its full length.

Figure 6 is a front elevation of the film holder and its ground glass.

Figure 7 is a longitudinal sectional view of the film holder shown in Figure 6.

Figure 8 is a longitudinal sectional view of the film holder, drawn to enlarged scale and showing the cardboard slides and films therein.

Referring now to the drawing in which like characters of reference designate similar parts in the various views, 4 designates the bottom of a casing. From the rear end of the casing spaced back walls 2 and 3 rise vertically and extend to vertical side walls 1 which extend below the bottom 4 and are provided with longitudinal grooves 33, the walls of which coact with the bottom to form guides for a plate 27 for adjusting a bellows 23 longitudinally toward and away from the back of the casing.

The bellows is secured at the rear end to a frame 22 which is spaced rearwardly from the open front end of the casing a sufficient distance to permit the bellows to be collapsed into this space. The front end of the bellows is secured to a frame 24 which is mounted upon the rear face of a vertically disposed plate 25 which forms a support for a conventional lens and shutter mechanism 26.

Film holder guide frames 15 are secured to the sides, bottom and top 5 of the casing, as best shown in Figure 5. The top of the casing extends from the open front thereof to just in rear of the guides 15.

A lid 8 is hinged to the rear edge of the top 5 of the casing through the medium of a hinge 9 and is provided with a handle 10. A pair of strips 13 are secured to the inner faces of the side walls 1 and coact with a transversely disposed strip 11 in forming a support for a horizontally disposed glass pane 14, the purpose of which will presently be explained. The lid 8 and pane 14 form a contact printing frame.

The side walls 1 of the casing are cut away obliquely at the rear end to a transversely disposed strip 6 which closes the top of the space between the two back walls 2 and 3. A pair of obliquely inclined strips 12 are secured to the side walls below and parallel with the obliquely disposed top edges of the side walls and extend from the transversely disposed strip 11 to the upper portion of the inner back wall 3 of the casing. These strips support a removable lid 7 which is equipped with a handle 10'. When the lid is removed the photographer, with a black cloth over his head, may look at the ground glass 29 of a film holder, later described, to focus the camera.

As best shown in Figure 3, a plug connector 21 is secured to the outermost back wall 2 and is connected to the socket, not shown, of a small ruby bulb 20 which projects through the inner back wall 3 as best shown in Figure 4. As best shown in Figure 1, a white bulb 18 projects through the inner back wall 3 laterally of the ruby bulb 20 and is screwed into a socket 17 carried by the outer back wall 2. A switch 19 is secured to the outer back wall 2 and is connected in circuit with the white bulb 18 to control this bulb independently of the ruby bulb, which latter is used at all times to permit the photographer to observe what he is doing. The white bulb is used to project light for printing and enlarging purposes, as will presently be explained.

A reflector 16 is provided with a rear portion extending at an angle of about 30° to the bottom 4 of the casing for reflecting light rays forwardly. The reflector extends along the bottom of the casing forwardly of the bulb 18 and then is directed upwardly against the inner side of the lower portion of the film holder guide 15.

As best shown in Figures 6, 7 and 8, a film holder 28 is slidably mounted in an opening 32, best shown in Figure 5, between film holder guides 15 disposed in the casing at the rear end of the bellows. The film holder is equipped with two grooves 30 to receive cardboard slides 31, shown best in Figure 2, to protect films or plates from the light. In the center of the film holder a ground glass 29 is mounted. Grooves 50 and 51 are formed in the film holder between the cardboard slides 31 and the ground glass 29, and are of sufficient size to permit insertion of a plate or a film 52 against the glass back of the slides. The upper grooves 50 are deeper than the lower grooves 51 to permit the plate or film to be raised up in the upper grooves and dropped into the lower grooves.

A ground glass 53 is removably mounted in guides 54 in the casing, near the bulb 18, to diffuse the light rays from the bulb when using the apparatus for the purpose of enlarging and printing.

The outer back wall 2 of the casing is removably secured in place through the medium of screws 34 to permit inspection and repairs of the electrical connections.

In using the apparatus as a studio camera, the casing is placed on a stand or table facing the object to be snapped. The slanting lid 7 is then removed from the top of the camera. Then an empty film holder is placed in the opening 32 in the top of the camera. The shutter is then opened. The photographer, with a black cloth over his head and over the back of the camera, looks through the sight opening unsealed by the removed lid 7, and focuses the picture to be taken on the ground glass of the film holder by adjusting the bellows back and forth until the image is sharp, although upside down. Then the film holder is removed and replaced with a loaded holder. Then the shutter is closed and the front cardboard slide removed from the holder. The picture is then snapped and the cardboard slide is again replaced before the holder is removed.

To use the apparatus for copying, a snapshot or a photo is placed on the studio wall or other support in the direct rays of reflected light. The camera is then used as is described in the preceding paragraphs.

To use the apparatus as an enlarging machine, the negative is placed in front of the ground glass in the film holder. Then both cardboard slides are removed from the holder and the holder is placed in the opening 32 between the film holder guides 15. The shutter is then opened using the largest diaphragm opening. The image is then thrown on a white wall or screen by sliding the bellows back and forth. When an image of the desired size is secured, the bromide paper is placed in a holder on the wall where the image appeared and the diaphragm opening is adjusted to produce a sharp image. Then an exposure of at least 45 seconds may be made while using a white enlarging bulb 18 in the camera.

To use the device as a printer, the enlarging bulb is replaced with a white 30-watt bulb. The current supply wires are then plugged in the ruby bulb 20, the latter giving a safe light to permit the photographer placing a negative on top of the glass 14 after the lid 8 is rocked open. Then the printing paper is placed on top of the negative, using a mask, if desired, and then the lid 8 is closed down tight. An exposure of about 5 seconds, using the 30-watt bulb, is usually sufficient.

When the apparatus is used for enlarging and printing, the ground glass 53 is disposed in the guides 54 but at other times it is removed. The ground glass is more opaque at the central portion than at the edged portions to diffuse light uniformly.

From the above description it is thought that the construction and operation of the invention will be fully understood without further explanation.

What is claimed is:

Photographic apparatus comprising a casing open at the front end, film holder guides disposed in the casing rearwardly of the open front thereof, a bellows support slidably secured to the casing, a bellows carried by the support and collapsible into the open front end of the casing, a lens and shutter mechanism carried by said support, a film holder supported by the guides and having a ground glass, a ruby light in the casing, a switch on the casing, a white light in the casing in circuit with the ruby light and controlled by said switch, a reflector in the casing extending along the bottom wall and rear face of the film holder guides, said reflector having a rear portion extending at an angle of about 30° to the axis of the casing and the bellows, and a removable lid closing a sight opening in the rear upper end of the casing to permit the ground glass of the film holder being viewed for focusing.

JOSEPH G. MORGAN.